United States Patent [19]

Berg

[11] Patent Number: 5,504,864
[45] Date of Patent: Apr. 2, 1996

[54] LOW POWER-CONSUMPTION INTERFACE APPARATUS AND METHOD FOR TRANSFERRING DATA BETWEEN A HAND-HELD COMPUTER AND A DESK TOP COMPUTER

[75] Inventor: Lawrence H. Berg, Grants Pass, Oreg.

[73] Assignee: Traveling Software, Inc., Bothell, Wash.

[21] Appl. No.: 235,000

[22] Filed: Apr. 29, 1994

[51] Int. Cl.$^6$ .................................................. G06F 13/00
[52] U.S. Cl. .............................. 395/200.01; 364/DIG. 1; 364/DIG. 2; 364/238.6; 364/239; 364/260; 364/260.1
[58] Field of Search .................. 364/DIG. 1, MS File, 364/DIG. 2, MS File; 395/200, 275, 500, 575, 725, 750, 808, 200.01, 200.02, 250, 280, 283, 286, 500, 750

[56] References Cited

U.S. PATENT DOCUMENTS

| | | | |
|---|---|---|---|
| 4,075,608 | 2/1978 | Koenig | 340/166 R |
| 4,144,565 | 3/1979 | Bouknecht et al. | 364/200 |
| 4,217,624 | 8/1980 | Tuck | 361/394 |
| 4,527,079 | 7/1985 | Thompson | 307/475 |
| 4,598,410 | 7/1986 | Smith et al. | 375/3 |
| 4,602,127 | 7/1986 | Neely et al. | 179/2 A |
| 4,603,320 | 7/1986 | Farago | 340/347 DD |
| 4,607,170 | 8/1986 | Wickman | 307/147 |
| 4,631,698 | 12/1986 | Walsh et al. | 364/900 |
| 4,686,506 | 8/1987 | Farago | 340/347 DD |
| 4,703,198 | 10/1987 | Porter et al. | 307/473 |
| 4,739,502 | 4/1988 | Nozaki | 365/233 |
| 4,845,381 | 7/1989 | Cuevas | 307/264 |
| 4,852,041 | 7/1989 | Nakano | 364/900 |
| 4,853,560 | 8/1989 | Iwamura et al. | 307/296.1 |
| 4,866,602 | 9/1989 | Hall | 364/200 |
| 4,884,287 | 11/1989 | Jones et al. | 375/121 |
| 5,023,824 | 6/1991 | Chadima, Jr. et al. | 364/708 |
| 5,157,769 | 10/1992 | Eppley et al. | 395/200 |

OTHER PUBLICATIONS

Description of DS1275 Line-Powered RS-232 Transceiver Chip manufactured by Dallas Semiconductor, Dallas Semiconductor, 1990–1991 Product Data Book, 4401 South Beltwood Parkway, Dallas, Texas 752441, pp. 758–767.

Motorola Semiconductor Technical Data, Motorola Telecommunications Device EIA–232–D/V.28 Driver/Receiver Data, rev. 2, 1989, pp. 2–428–2–434.

Primary Examiner—Robert B. Harrell
Attorney, Agent, or Firm—Stoel Rives

[57] ABSTRACT

Disclosed is a computer data interface (100) for connecting a hand-held computer (104) and a desktop computer (102). The computer data interface includes a cable having connectors at each end. A voltage conversion circuit (116) is mounted adjacent to one of the connectors. The voltage conversion circuit receives data signals from the hand-held computer and transmits the signals to the desktop computer at voltage levels compatible with the desktop computer, Similarly, the voltage conversion circuit receives signals from the desktop computer and transmits the signals to the hand-held computer at voltage levels compatible with the hand-held computer.

10 Claims, 4 Drawing Sheets

ன,504,864

LOW POWER-CONSUMPTION INTERFACE APPARATUS AND METHOD FOR TRANSFERRING DATA BETWEEN A HAND-HELD COMPUTER AND A DESK TOP COMPUTER

FIELD OF THE INVENTION

The invention relates to computer communications in general and, more specifically, to a method and apparatus for providing data transfer between a hand-held computer and a desktop computer.

BACKGROUND OF THE INVENTION

The use of hand-held computers continues to expand as their capabilities increase and the cost associated with ownership and use of such computers declines. Popular commercially available hand-held or palmtop computers include the Casio B.O.S.S.™, Sharp Wizard™, and the Hewlett-Packard and Psion series of computers. Hand-held computers have traditionally been used for data management such as day planning, but their use is expanding to electronic mail, spreadsheet, and other tasks.

The most significant advantage of hand-held computers is their relative light weight and small size. In an effort to minimize the size of hand-held computers, they typically do not include a full-size keyboard. Ironically, this is perhaps also their most significant disadvantage, because data entry on the smaller keyboards is not as efficient as it is on a desktop computer. A solution to this problem is to interconnect the hand-held computer with a desktop computer using a cable, input the data to be entered into the desktop computer, and then transfer the input data to the hand-held computer. Coupling the two computers also allows data on the hand-held computer to be transferred to a desktop computer for archival purposes.

Many of the available hand-held computers operate at voltage levels that are incompatible with the serial ports on desktop computers. For example, logical zero and one on a hand-held computer may be at zero and five volts, respectively, whereas on a desktop computer the voltage levels may be in the range of negative 15 volts for a logical zero and positive 15 volts for logical one. Thus, the voltage levels must be convened for communications to be successful. A number of computer data interface solutions have been designed to provide compatibility between hand-held and desktop computers. An early solution was a cable that connected the Sharp Wizard to an IBM® or IBM-compatible personal computer. However, the cable was inconvenient because the voltage conversion circuitry was contained in a relatively bulky housing and was externally powered. A more advantageous solution is disclosed in U.S. Pa. No. 5,157,769, assigned to Traveling Software, Inc., the assignee of the present application.

U.S. Pat. No. 5,157,769 (the '769 patent) discloses a computer data interface for connecting a hand-held computer and a desktop computer. The computer data interface includes a cable having connectors at each end. A voltage level conversion circuit is mounted adjacent to one of the connectors for receiving data signals from the hand-held computer and transmitting the signals to the desktop computer at voltage levels compatible with the desktop computer. Similarly, the level conversion circuit receives signals from the desktop computer and transmits the signals to the hand-held computer at voltage levels compatible with the hand-held computer. The level conversion circuit is powered by the desktop computer to prevent draining the batteries of the hand-held computer.

FIG. 2 of the '769 patent illustrates a voltage level conversion circuit for transmitting data between an IBM or IBM-compatible personal computer (PC) and a Sharp Wizard hand-held computer. The circuit utilizes a Motorola® MC 145406 integrated circuit to perform voltage conversions necessary to allow the two computers to communicate. FIG. 3 of the '769 patent illustrates a level conversion circuit that may be used to transmit data between a PC and a Casio B.O.S.S. (Boss) hand-held computer. The primary components in the level conversion circuit of FIG. 3 include a number of resistors 42, a transistor 44, a diode 48, and an isolation circuit 52. The transistor 44 has its base connected to the transmit data TxD line (pin 2 of the PC), its emitter connected to ground, and its collector connected to the positive voltage source V+ of the PC through one of the resistors 42 as well as the receive line R of the Boss through a resistor 50. The isolation circuit is coupled between the collector through two resistors 42 and ground on the Boss.

Briefly, the operation of the level conversion circuit of FIG. 3 is as follows. When the TxD line (pin 2) is low, positive voltage is applied to the receive line R of the Boss, i.e., from V+ with the voltage being clamped by the diode 48. When TxD goes high, the transistor 44 turns on, sinking current to ground and pulling R low. The isolation circuit is needed to disconnect the ground of the Boss from the PC to ensure that the PC does not drain the batteries of the Boss. This may result because pin 20 will be low when the PC is turned off, and thus current may be sourced from R through the resistors 50 and 42 to pin 20.

Transmission in the opposite direction is accomplished using a capacitor 34, a diode 36 and an operational amplifier (op amp) 40. The positive terminal of the op amp 40 is connected to V+ through a resistor 42. The negative terminal is connected directly to the transmit line of the Boss. The output of the op amp is connected to the receive line RxD (pin 3) of the PC. The capacitor 34 is charged with a negative voltage using the TxD line (pin 2). When TxD is low, the output of the op amp is at V+. When TxD is high, the output of the op amp is switched to the negative voltage supply stored in capacitor 34.

A more recent computer data interface to become commercially available is the model CE-137T level converter manufactured and sold by Sharp Corporation. The CE-137 T level converter may be used to transfer data between the Sharp Wizard and either a Macintosh computer or a PC in a single interface. Prior to the CE-137 T level converter, available computer data interfaces typically were designed to connect a hand-held computer to only one of the two types of computers, either Macintosh or PC's, i.e., a first interface would be required for data transfer if a user had a Macintosh computer, and a second, different interface would be required for data transfer if a user had a PC. The CE-137 T level converter includes two Motorola integrated circuits to provide voltage conversions between a hand-held computer and both Macintosh computers and PC's.

The computer data interfaces discussed above successfully accomplish voltage level conversions to allow a hand-held computer to communicate with a desktop computer. However, prior art computer data interfaces have typically required integrated circuits. In earlier models, the integrated circuits were powered externally. In the '769 patent and CE-137 T level converter, the integrated circuits were powered by the desktop computer. The invention is a simplified circuit design that does not require use of integrated circuits or external power, presenting cost, space, and power savings. The power savings may be significant if the desktop computer is also battery powered.

SUMMARY OF THE INVENTION

The invention is a system for transmitting data between a low-power transmitting device having a binary data transmitting element and a desktop computer having a power source and a data receiving element. A low-power signal from the transmitting device represents a logical one and the absence of a signal represents logical zero. The system comprises (a)a switching transistor, coupled between the power source and the data receiving element; (b) a control component, coupled to the transistor, for establishing a control voltage that dictates the threshold at which the transistor turns on and off, and (c)a component for conveying data from the data transmitting element of the transmitting device to the transistor, wherein the transistor turns on when the low-power signal is conveyed from the transmitting device causing current to flow between the power source and the data receiving element.

In accordance with other aspects of the invention, the transmitting device is a hand-held computer. Further, the component for conveying data from the data transmitting element of the transmitting device to the transistor is a cable.

In accordance with other aspects of the invention, the component for conveying data from the data transmitting element of the transmitting device to the transistor is a wireless communications system.

In accordance with still further aspects of the invention, the system includes a method for transmitting data between a hand-held computer having a data transmitting element and a desktop computer having a positive voltage source, a negative voltage source, and a data receiving element. The method comprises the steps of: (a) coupling the data receiving element to the negative voltage source of the desktop computer; (b) coupling a transistor between the data receiving element and the positive voltage source; (c) providing a data path between said transistor and the data transmitting element of the hand-held computer; and (d) using the data transmitting element to transmit digital data from the hand-held computer to the desktop computer wherein when a first logic state is being transmitted said transistor is turned on and when a second logic state is being transmitted said transistor is off.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
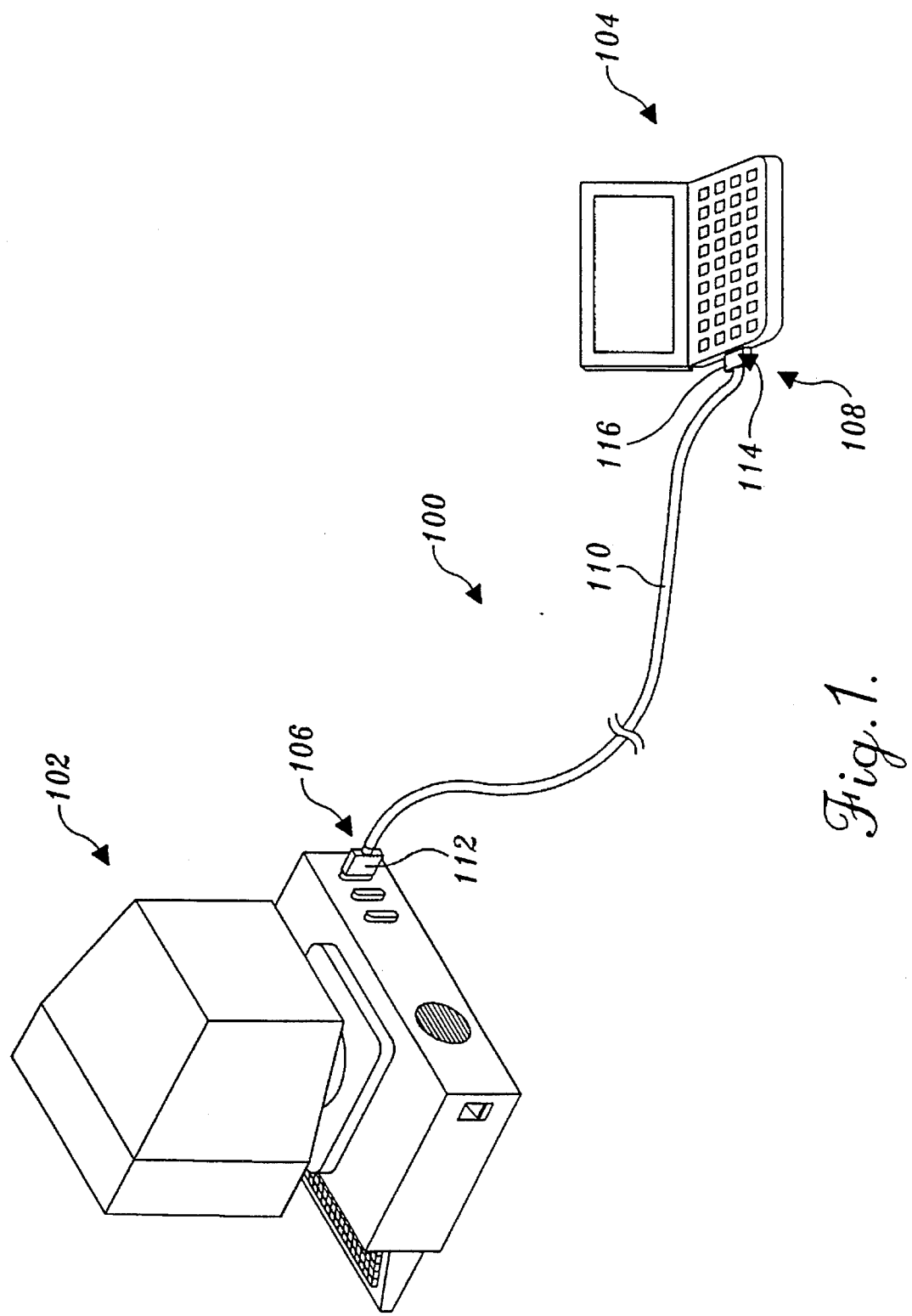
FIG. 1 illustrates connecting a desktop computer to a hand-held computer using a data transmitting system in accordance with the invention.

With reference to FIG. 1, a computer data interface 100 in accordance with the invention connects a desktop computer 102 with a hand-held or palmtop computer 104. The hand-held computer may be, for example, a Casio B.O.S.S., Sharp Wizard, Hewlett-Packard, or Psion hand-held computer. Throughout the specification, the term desktop computer is hereby defined as including IBM, IBM compatible, Apple, and similar microcomputers, whether they be designed for the desktop use only or portable computers. Further, the term "personal computer" (PC) is used throughout the specification to refer to IBM and IBM-compatible computers and the term "Macintosh" is used to refer to computers produced by the Apple Corporation. Each computer will typically include a display, keyboard, processor, and volatile and nonvolatile memories. Further, the desktop and hand-held computers 102 and 104 include communications ports 106 and 108, respectively, that facilitate communications with other computers and peripheral devices.

In one embodiment, the computer data interface includes a cable 110 having connectors 112 and 114 that may be connected to the communications ports 106 and 108, respectively, to provide data transmission between the desktop and hand-held computers. Alternatively, the computers may communicate through a wireless link, as described further below. The computer data interface also includes a level conversion circuit 116, preferably housed with or adjacent to the connector 114, that enables the desktop and hand-held computers to communicate effectively. Software running on each computer interprets the signals being sent back and forth across computer data interface. Such software is known in the art, and thus is not described herein.

Figure 2:
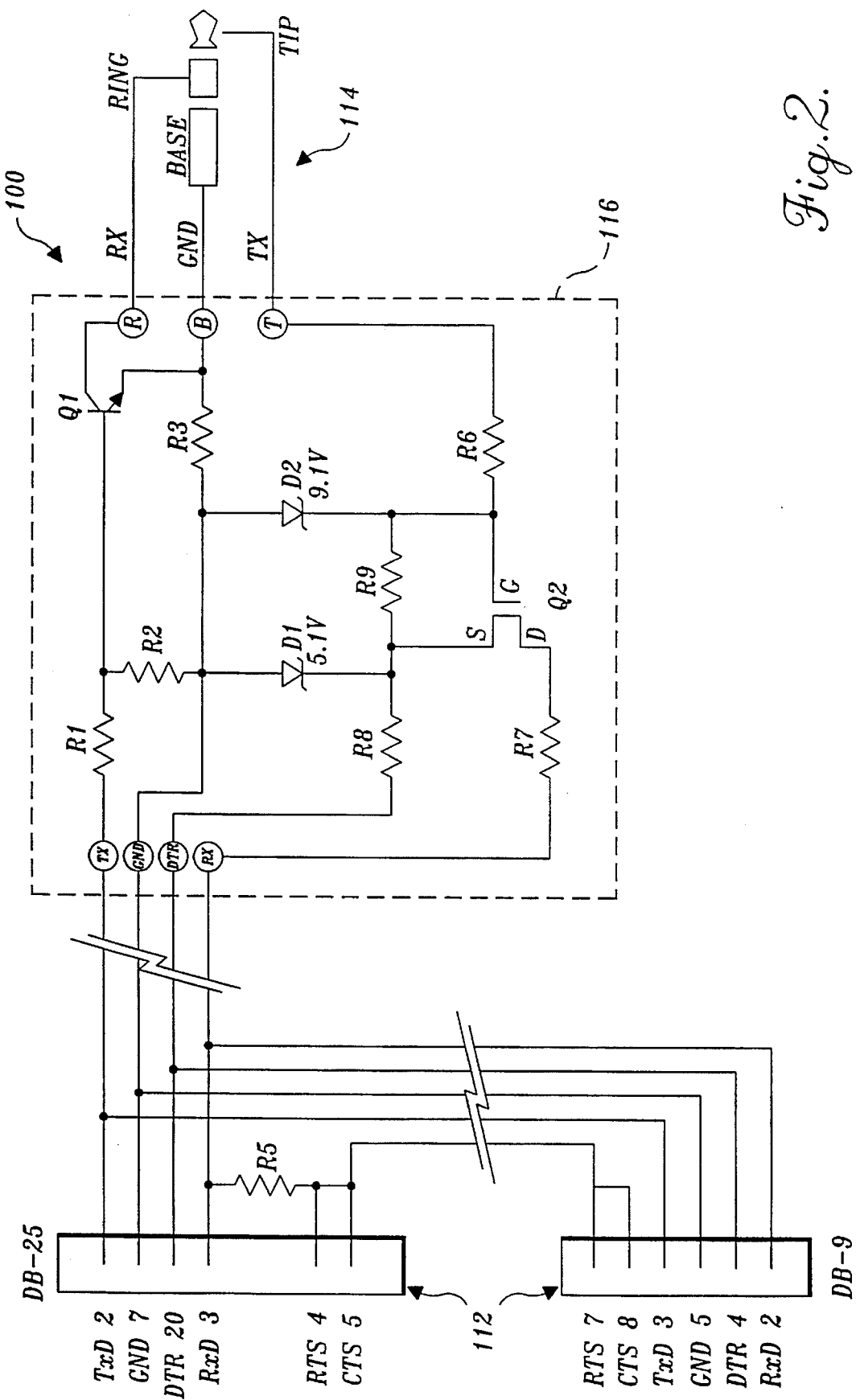
FIG. 2 is a schematic diagram of a first exemplary embodiment of the invention for connecting a PC to a Casio B.O.S.S.

FIG. 2 illustrates a first exemplary embodiment of the computer data interface 100 for use in connecting a PC to a Casio B.O.S.S. (Boss) in accordance with the invention. As shown on the left, the computer data interface is connected to the PC using either a conventional DB-25 connector or a conventional DB-9 connector. The specific pins on the DB-25 and DB-9 that are used by the computer data interface and their functions are listed below:

| DB-25 Connector | DB-9 Connector | Function |
| --- | --- | --- |
| Pin 2 | Pin 3 | T × D (transmit data) |
| Pin 7 | Pin 5 | Ground |
| Pin 20 | Pin 4 | DTR (+V) |
| Pin 3 | Pin 2 | R × D (receive data) |
| Pins 4 & 5 | Pins 7 & 8 | RTS & CTS (−V) |

Opposite the DB-25 and DB-9 connectors, the computer data interface is connected to a Casio Boss through a phono plug (connector 114) that includes receive (R), transmit (T), and ground (B) contacts.

To transfer data from the PC to the Boss, the level conversion circuit 116 includes a transistor Q1 having its base connected to the TxD pin of the connector 112 through a resistor R1 as well as to ground of the PC through a resistor R2. The collector of transistor Q1 is connected to the receive contact R on connector 114. The emitter of transistor Q1 is connected to ground on the PC through a resistor R3 and directly to ground on the Boss via the ground contact B of connector 114. The transistor Q1 is preferably an NPN transistor. Suitable values for the resistors R1, R2, and R3 are 4.7 kiloOhm (kΩ), 4.7 kΩ and 270 Ω, respectively.

The operation of the level conversion circuit may be briefly described as follows: By convention, contact R on connector 114 is kept high internally by the Boss. When data are not being transmitted by the PC or when sending a logical zero, the TxD line of the PC is low and transistor Q1 is in an off state. In this instance, transistor Q1 is an "open-collector," and thus has no effect on R. Conversely, when a logical one is being transmitted, the TxD line becomes high, turning transistor Q1 "on" and pulling R to ground. Software running on the PC and Boss controls the operation of the computers to change and sense, respectively, the voltage levels on the TxD and R lines, thereby accomplishing data transfer.

It has been found that to ensure proper operation of the level conversion circuit 116, the transistor Q1 must be in relatively close proximity to the Boss. Otherwise, interference on the line between the Boss and the transistor Q1 may cause R on the connector 114 to be pulled low, causing spurious results during data transfer. Thus, the level conversion circuit 116 is preferably placed adjacent to the connector 114, with the length of cable 110 extending from circuit 116 to connector 112.

In transferring data from the Boss to the PC, the invention allows the Boss or other computer to send data to a PC without requiring any external power and using very few discrete components. As will be understood from the following description, this is accomplished by establishing a path between the positive voltage source of the PC and its receive line RxD of the PC when a logical one is to be transmitted, and isolating the positive voltage source otherwise. In accordance with the invention, a low power signal from the hand-held device is used to establish the path during transmission of a logical one. Since the PC's own power is used to drive the receiving line of the PC, the power required of the hand-held computer to communicate with the PC is negligible.

The basic components in the level conversion circuit 114 that are required to transfer data from the Boss to the PC include a field-effect transistor (FET)Q2, a zener diode D1, and a resistor R5. The resistor R5 connects RxD of connector 112 to the negative voltage source RTS of the PC. The gate of the FET Q2 is connected to contact T of the connector 114 through a resistor R6 and to ground on the connector 112 through a zener diode D2. Specifically, the anode of diode D2 is directly connected to ground on the PC and connected to ground on the Boss through the resistor R3. The cathode of diode D3 is connected to the gate of transistor Q2. The drain of Q2 is connected to the Rx pin on connector 112 through a resistor R7.

Specific connections for the source of transistor Q2 include a connection between the cathode of diode D1 and the source, and a connection from the anode to ground of the PC. The source of transistor Q2 is also connected to the positive voltage source DTR (+V) of the PC through a resistor RS. Finally, the source is connected to the cathode of the diode D2 through a resistor R9.

With regard to the operation of the level conversion circuit 116 during data transfer from the Boss to the PC, the diode D1 sets the threshold for turning Q2 on and off by clamping the positive voltage source DTR to approximately 5.1 volts. When T is high, the potential at the gate of Q2 will be around 3–5 volts, and Q2 will be in an off state. Thus, there is no current flowing between the source and drain, and RxD will continue to be pulled low by the negative voltage source RTS (–V) of the PC. When T goes low, Q2 turns on, and Rx is connected to the clamped positive voltage source DTR, pulling Rx to a high state. In this manner, data transfer is accomplished with the logistics handled by software.

Transistor Q2 is preferably an FET rather than another type of transistor because field-effect transistors draw little or no current, saving the batteries on the Boss. Also, use of an FET is advantageous because the drain of the FET can be at a negative voltage while still allowing the threshold to be properly set such that the FET may be switched on and off using the transmit line T of the Boss. In one embodiment, the diodes D1 and D2 are rated at 5.1 and 9.1 volts, respectively. A suitable value for the resistors R5 and R6 is on the order of 4.7 kΩ. A suitable value for resistors R7 and R8 is 270 Ω; and resistor R9 may be on the order of 1 MΩ.

Figure 3:
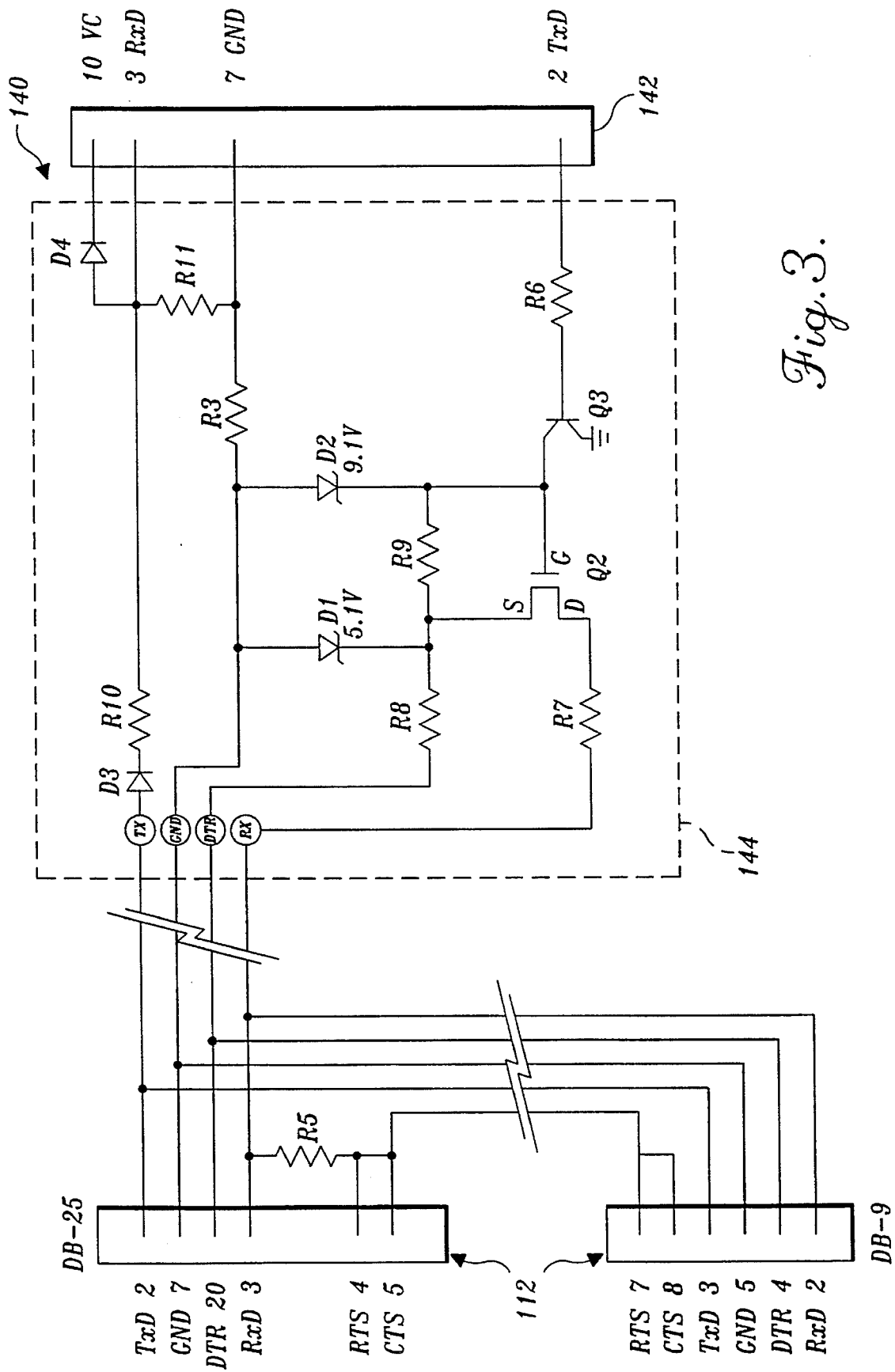
FIG. 3 is a schematic diagram of a second exemplary embodiment of the invention for connecting a PC to a Sharp Wizard.

FIG. 3 illustrates a second exemplary embodiment of a computer data interface 140 for use in connecting a PC to a Sharp Wizard in accordance with the invention. As in FIG. 2, the computer data interface is connected to the PC using either a DB-25 connector or DB-9 connector. The computer data interface is connected to a Sharp Wizard using a 15-pin interface connector 142. The specific pins on the connector 142 and each pin's function is listed below:

| 15-Pin Connector | Function |
| --- | --- |
| Pin 2 | T × D (transmit data) |
| Pin 7 | Ground |
| Pin 10 | VC (+V) |
| Pin 3 | R × D (receive data) |

The computer data interface 140 includes a voltage level conversion circuit 144 that has many of the same components, performing the same functions, as the circuit previously described. These components have identical reference numerals. To transfer data from the PC to the Sharp Wizard, the voltage conversion circuitry includes an additional transistor Q3 that is connected between the transistor Q2 and the resistor R6. Specifically, the base of transistor Q3 is connected to resistor R6, the emitter is connected to the gate of transistor Q2, and the collector is connected to ground, i.e., pin 7 of the connector 142. It has been found that the data signals transmitted by the Wizard are the inverse of those from the Boss. The transistor Q3 acts to invert data to be sent as it is transmitted, so that the transistor Q2 performs as described above.

The circuitry for transferring data from the PC to the Wizard includes a diode D3, a Schottky diode D4, and a pair of resistors R10 and R11. The anode of the diode D3 is connected to the TxD pin of connector 112. The cathode of diode D3 is connected to the anode of diode D4 through the resistor R10. The diode D3 essentially prevents negative voltage from reaching the receive line RxD of the Wizard. Thus, when a logical zero is present on the TxD line of connector 112, the voltage at RxD of the Wizard will be at or near zero volts, and perceived as logical zero to the Wizard. The resistors R10 and R11 act as a voltage divider when a logical one is being sent by the PC. The result is that the voltage levels presented to the Wizard will be of sufficient magnitude to represent a logical one to the Wizard, while still being within the Sharp Corporation's specifications establishing maximum voltages that may be applied to the Wizard. The diode D4 provides added assurance that maximum voltage tolerances are met. A suitable value for resistors R10 and R11 is 270 Ω.

Figure 4:
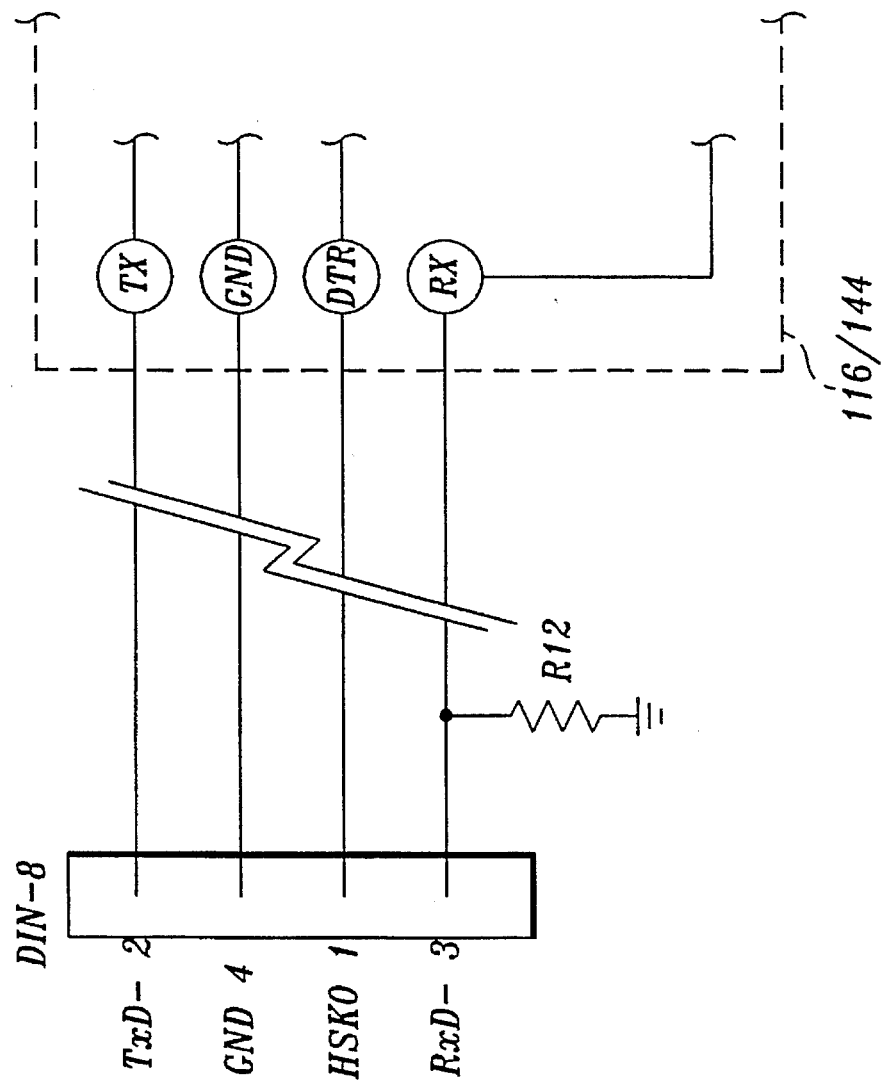
FIG. 4 is a block diagram showing the connections necessary to use the circuits shown in FIGS. 2 and 3 with a Macintosh computer.

FIG. 4 illustrates the pin connections necessary to modify the computer data interfaces illustrated in FIGS. 2 and 3 for use with Macintosh computers. Specifically, Macintosh computers typically include a Din-8 connector 150 having the following pins:

| Din-8 Connector | Function |
| --- | --- |
| Pin 2 | T × D- (transmit data) |
| Pin 4 | GND (ground) |
| Pin 1 | HSKO (+V) |
| Pin 3 | R × D- (receive data) |

By connecting the pins of connector 150 as shown in FIG. 4, i.e., TxD- to Tx, ground to ground, HSK0 to DTR, and RxD- to Rx, the computer data interface may be used to interface a Macintosh with a Boss using the voltage conversion circuit 116 of FIG. 2 or a Wizard using the voltage conversion circuit 144 of FIG. 3. In addition to the above connections, the RxD- pin is connected to ground through a resistor R12, which may be on the order of 4.7 kΩ. Unlike PC's, the Din-8 connector does not provide access to a negative power supply. However, pulling the Rx line of the voltage conversion circuit to ground, as opposed to −V in the PC version, is adequate. For use with a Macintosh the voltage conversion circuits generally operate in the same manner described above.

As will be appreciated by those skilled in the art, the computer data interface is relatively inexpensive to build, does not require any external power, and does not require integrated circuits. It will also be appreciated that the computer data interface may be used to connect desktop computers to other types of computers besides the Boss and Wizard. Along this line, the teaching of the invention may be used by virtually any device that a designer wishes to have communicate with desktop computers, e.g., sensors for temperature, humidity, etc. Virtually no power is required of the communicating device because the desktop computer's power is used to drive the transmit line. This feature is particularly advantageous when the invention is used with battery-operated devices. Further, the computer data interface may incorporate wireless communications technology to provide a data path between the computers and thus alleviate the necessity of a cable.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer data interface for transmitting data between a low-power transmitting device having a binary data transmitting element, with a presence of a low-power signal from the low-power transmitting device representing a logical one and an absence of the low-power signal representing a logical zero, and a computer having a power source and a data receiving element, comprising:

a voltage level conversion circuit without an integrated circuit, the voltage level conversion circuit including a switching transistor coupled between the power source and the data receiving element and having an off-state in which the switching transistor is substantially an open-circuit and an on-state in which a current flows between the power source and the data receiving element;

a diode coupled to the switching transistor for establishing a threshold voltage at which the switching transistor switches between the on-state and the off-state, the threshold voltage corresponding to the presence of the low-power signal from the low-power transmitting device; and a data path for conveying data from the binary data transmitting element of the low-power transmitting device to the switching transistor, wherein the switching transistor switches to the on-state when the low-power signal is conveyed from the low-power transmitting device, thereby causing the current to flow between the power source and the data receiving element.

2. The computer data interface of claim 1 wherein the low-power transmitting device is one of a hand-held computer, a palmtop computer, a personal organizer, and a personal assistant.

3. The computer data interface of claim 1 wherein the data path for conveying data from the binary data transmitting element of the low-power transmitting device to the switching transistor is a cable.

4. The computer data interface of claim 1 wherein the computer is one of a desktop computer, an IBM personal computer, an IBM-compatible computer, and an Apple Macintosh computer.

5. The computer data interface of claim 1 wherein at least one of the computer and the low-power transmitting device is powered by a battery.

6. The computer data interface of claim 1 wherein the voltage conversion circuit is positioned in a close proximity to the low-power transmitting device.

7. The computer data interface of claim 1 wherein the switching transistor is a field-effect transistor.

8. A method for transmitting data between a hand-held computer having a data transmitting element and a desktop computer having a positive voltage source, a negative voltage source, and a data receiving element, the method comprising:

coupling the data receiving element to the negative voltage source of the desktop computer;

coupling a normally nonconducting field-effect transistor between the data receiving element and the positive voltage source;

providing a first data path between the normally nonconducting field-effect transistor and the data transmitting element of the hand-held computer; and transmitting a first logic state and a second logic state from the hand-held computer to the desktop computer, wherein when the first logic state is being transmitted the normally nonconducting field-effect transistor conducts a current between the positive voltage source and the data receiving element and when the second logic state is being transmitted the normally nonconducting field-effect transistor does not conduct the current between the positive voltage source and the data receiving element.

9. The method of claim 8, wherein the hand-held computer further includes a data receiving element and the desktop computer includes a data transmitting element, the method further including:

providing a second data path between the data transmitting element of the desktop computer and the data receiving element of the hand-held computer; and transmitting digital data from the data transmitting element of the desktop computer through the second data path to the data receiving element of the hand-held computer.

10. The method of claim 9 wherein the first data path and the second data path is provided by a cable.

* * * * *